(12) United States Patent
Robinson et al.

(10) Patent No.: US 11,409,917 B2
(45) Date of Patent: Aug. 9, 2022

(54) UN-PHOTOGRAPHABLE SCREENS AND DISPLAYS

(71) Applicant: Red Hat, Inc., Raleigh, NC (US)

(72) Inventors: Paul Fletcher Robinson, Whitley Bay (GB); Thomas John Jenkinson, North Yorkshire (GB)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/003,456

(22) Filed: Aug. 26, 2020

(65) Prior Publication Data

US 2022/0067219 A1 Mar. 3, 2022

(51) Int. Cl.
*G06F 21/84* (2013.01)
*G09G 5/10* (2006.01)

(52) U.S. Cl.
CPC ............ *G06F 21/84* (2013.01); *G09G 5/10* (2013.01); *G09G 2320/062* (2013.01); *G09G 2320/0686* (2013.01); *G09G 2358/00* (2013.01)

(58) Field of Classification Search
CPC .. G06F 21/84; G06F 21/60; G06F 2221/2137; G09G 5/10; G09G 2320/062; G09G 2320/0686; G09G 2358/00; H04N 2013/40; H04N 5/913
See application file for complete search history.

(56) References Cited

U.S. PATENT DOCUMENTS

| | | | |
|---|---|---|---|
| 7,693,330 B2* | 4/2010 | So | H04N 19/105 382/210 |
| 10,239,454 B2 | 3/2019 | Lang et al. | |
| 10,252,080 B2 | 4/2019 | Lee et al. | |
| 10,878,739 B2* | 12/2020 | Yi | G06F 3/1446 |
| 2002/0168069 A1* | 11/2002 | Tehranchi | H04N 5/913 380/235 |
| 2016/0210473 A1* | 7/2016 | Cohen | G06F 21/10 |
| 2020/0184080 A1* | 6/2020 | Trim | G06F 40/40 |
| 2021/0104209 A1* | 4/2021 | Woodgate | G06F 21/84 |

FOREIGN PATENT DOCUMENTS

WO WO 2016/168383 A1 10/2016
WO WO 2019092399 A1 5/2019

OTHER PUBLICATIONS

Jeremy Hsu; "LiShield Can Block Smartphone Cameras for Privacy's Sake", Oct. 17, 2017, IEEE Spectrum, 2 Pages.
Kate Greene, "Lights, Camera—Jamming", Jun. 22, 2006, MIT Technology Review, 3 Pages.
Khai N. Truong, Shwetak N. Patel, Jay W. Summet and Gregory D. Abowd; "Preventing Camera Recording by Designing a Capture Resistant Environment", 2005, College of Computing & GVU Center, Georgia Institute of Technology, Atlanta, GA, 14 Pages.

* cited by examiner

*Primary Examiner* — Antonio A Caschera
(74) *Attorney, Agent, or Firm* — K&L Gates LLP

(57) ABSTRACT

A display device includes a display comprising a plurality of pixels. The display also has a plurality of regions. At least one of the plurality of regions is a protected region and the protected region includes at least one protection pixel. The display device also includes an image generator configured to receive a source image data for display content, identify a portion of the display content that includes sensitive data, and output the display content such that at least a portion of the protected region containing the sensitive data is displayed in at least one of a protection wavelength and a protection brightness.

20 Claims, 8 Drawing Sheets

UN-PHOTOGRAPHABLE SCREENS AND DISPLAYS

BACKGROUND

Electronic devices, including computers, tablets, televisions, cell phones, etc. include displays for providing information to users. Information can be provided on displays via word processors, the internet, email, videos, and the like. The information may be displayed as texts, graphics, and media. Users may also generate information on the display using computer applications. The electronic devices can include any suitable type of display, including for example a projection, plasma, light-emitting diode (LED), liquid-crystal display (LCD), organic light-emitting diode (OLED), etc.

Displays may have different screen resolutions, pixel counts, and viewing angles. For example, an LCD is an electronically modulated optical device that uses the light-modulating properties of liquid crystals. Each pixel of an LCD typically consists of a layer of molecules aligned between two transparent electrodes, and two orthogonal polarizing filters aligned along a vertical axis and a horizontal axis of the display. In many professional and work settings, sensitive or confidential information is often displayed on work computer displays.

SUMMARY

The present disclosure provides new and innovative un-photographable screens or displays and methods of protecting content on such screens and displays. In an example, a display device includes a display comprising a plurality of pixels. The display also has a plurality of regions. At least one of the plurality of regions is a protected region and the protected region includes at least one protection pixel. The display device also includes an image generator configured to receive a source image data for display content, identify a portion of the display content that includes sensitive data, and output the display content such that at least a portion of the protected region containing the sensitive data is displayed in at least one of a protection wavelength and a protection brightness.

In an example, a method includes receiving a source image data for display content, identifying a portion of the display content that includes sensitive data; and outputting the display content on a display. The display comprises a plurality of pixels and has a plurality of regions. At least one of the plurality of regions is a protected region and the protected region includes at least one protection pixel. The output display content is displayed such that at least a portion of the protected region containing the sensitive data is displayed in at least one of a protection wavelength and a protection brightness.

In an example, a non-transitory machine readable medium stores code, which when executed by at least one processor is configured to receive a source image data for display content, identify a portion of the display content that includes sensitive data, and output the display content on a display. The display comprises a plurality of pixels and has a plurality of regions. At least one of the plurality of regions is a protected region and the protected region includes at least one protection pixel. The output display content is displayed such that at least a portion of the protected region containing the sensitive data is displayed in at least one of a protection wavelength and a protection brightness.

Additional features and advantages of the disclosed methods, systems and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
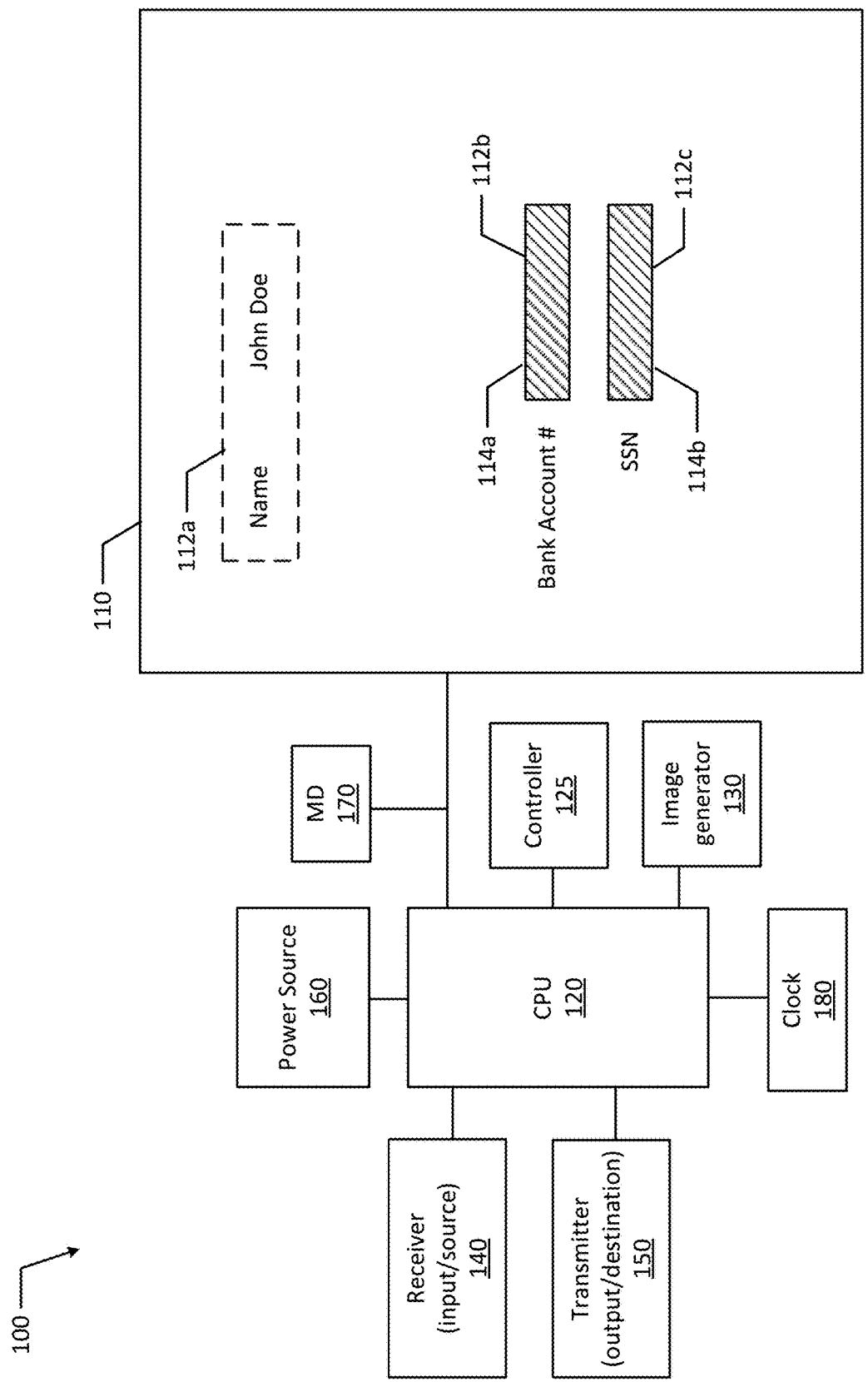
FIG. 1 illustrates a block diagram of an example un-photographable display device, according to example embodiments of the present disclosure.

Systems and methods are disclosed for an un-photographable screen or display as well as techniques for protecting sensitive data on such screens or displays to securely provide content to authorized users. For example, the disclosed systems and methods may be used to improve viewing security such that sensitive data is protected and users (or others) are prevented from making copies of the data. Specifically, the un-photographable screen or display disclosed herein may be configured such that sensitive data displayed on the screen is unable to be captured with a camera.

In highly sensitive scenarios, it is important to prevent system users from making copies of sensitive data. For example, a bank employee may have access to account details that could be used to commit fraud. Computer systems may be locked or configured in such a way to prevent users from taking electronic screenshots, secured by limiting internet access, or secured by blocking connection to peripherals (e.g., peripheral devices), such as a USB memory stick to prevent users from transferring sensitive data. Even though the above protection techniques may limit a user's ability to copy or transfer sensitive data, a user may still take a photograph or video of the screen with a camera (e.g., smartphone camera). When displaying sensitive content on a display or screen (e.g., computer, tablet, or phone screens), there may be a risk of an unauthorized users viewing the display and attempting to copy the information by taking a picture or video of the display. For example, when viewing sensitive information or confidential information, in public (e.g., on public transportation or while sitting at an airport) an unauthorized viewer may be able to take a picture or video of the display. Similarly, an authorized user may attempt to copy sensitive or confidential material. For example, a bank employee may either advertently or inadvertently make a copy of the sensitive data by using a camera (e.g., cell phone camera) to capture a photo or video of the displayed content.

To prevent both authorized users and unauthorized users from making copies of sensitive data with a camera, for example by preventing the sensitive data from being visible in a photograph or video, protection pixels are interspersed on the display that emit light configured to obscure the image or video captured by the camera. The light emitted by the protection pixels is invisible or non-visible to the human eye or naked eye and does not obscure normal viewing of the display. By doing so, the protection pixels may prevent a user (e.g., an authorized user or an unauthorized user) from copying sensitive data with a camera.

However, it is acknowledged that in some scenarios it may not be feasible to fully secure the connection between the screen or display and the other components or computer that is providing display instructions and generating display signals. For example, in the case where a homeworker has a company provided laptop and screen, the user may connect an additional monitor that lacks the un-photographable hardware and protection functionality in order to capture a video or photograph of the sensitive data displayed on the screen. Thus, the display may be associated with a software component that only supports displays with the appropriate hardware configurations, e.g., displays with protection pixel functionality. For example, a display may be prevented from showing any sensitive data if the display is unable to protect that data by activating protection pixels or other similar protection functionality (e.g., protection backlight).

The devices, systems and methods disclosed herein may operate based on an assumption that the software component is well secured. The software component may prevent the user from installing screenshot or screen-capture software. In a similar fashion, the software may be configured such that it denies or prevents connections to screens or displays that lack the protection functionality. In one example, the software may be configured to only allow connections to a specific make, model or type of display. In another example, the software may remove all other screen drivers, which would prevent other displays from being used. In another example, the displays and methods disclosed herein may be restricted to only displaying sensitive or confidential data when a display driver reports appropriate credentials that indicate the display supports protection pixels or other similar protection functionality.

FIG. 1 depicts a high-level component diagram of an example display device 100 for protecting sensitive data on a display in accordance with one or more aspects of the present disclosure. The privacy system 100 may include a display 110. The display 110 of system 100 may be associated with a processor or CPU 120, a controller 125, an image generator 130, a receiver 140, and a transmitter 150. Additionally, the system 100 may include a power source 160, a memory device 170 and a clock 180.

The image generator 130 may synchronize on time (e.g., a time on a clock 180), frequency, or on frames of display 110 such that dynamic determinations for which regions or areas of the display 110 to protect are synchronized with the content being displayed. In an example, timing associated with protecting sensitive data with dynamic display content may be synchronized using clock 180. In an example, the srand(time(NULL)) function may use the internal clock (e.g., clock 180) to control display sequences.

Processors (e.g., physical processors), such as CPU 120 may be communicatively coupled to memory devices (e.g., MD 170) and input/output devices, receivers (e.g., input, source or receiver 140), transmitters (e.g., output, destination or transmitter 150). As used herein, physical processor or CPU 120, refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). Processors 120 may be interconnected using a variety of techniques, ranging from a point-to-point processor interconnect, to a system area network, such as an Ethernet-based network. Local connections within each node, including the connections between a processor 120 and a memory device 170 may be provided by one or more local buses of suitable architecture, for example, peripheral component interconnect (PCI).

As discussed herein, a memory device 170 refers to a volatile or non-volatile memory device, such as RAM, ROM, EEPROM, or any other device capable of storing data. Processors 170 may be interconnected using a variety of techniques, ranging from a point-to-point processor interconnect, to a system area network, such as an Ethernet-based network. Connections between a processor 120 and a memory device 170 may be provided by one or more local buses of suitable architecture, for example, peripheral component interconnect (PCI).

In an example, especially for LCD displays, a pixel may be composed of individual subpixels. For example, a pixel may be composed of an individual red subpixel, a green subpixel, and a blue subpixel (otherwise referred to as an "R" subpixel, "G" subpixel, and "B" subpixel). Typically, a pixel may include three subpixels, however some displays may have more than three subpixels per pixel. For example, a display 110 may include pixels with four subpixels, such as a red "R" subpixel, a green "G" subpixel, a blue "B" subpixel, and a yellow "Y" subpixel (otherwise referred to as an "R" subpixel, "G" subpixel, "B" subpixel, "Y" subpixel). Alternatively, the pixel may include a red "R" subpixel, a green "G" subpixel, a blue "B" subpixel and a white "W" subpixel ("R", "G", "B", "W"). In another example, a pixel may include a red "R" subpixel, a green "G" subpixel, a blue "B" subpixel, a yellow "Y" subpixel and a cyan "C" subpixel ("R", "G", "B", "Y", "C"). Other examples may include two rows of subpixels in each pixel. The subpixels may have various shapes and may be rectangular, circular, square, etc. The above examples are for illustrative purposes only and are non-limiting. The un-photographable displays, screens and methods of protecting sensitive information disclosed herein may apply to displays with additional pixel or subpixel arrangements, configurations, and/or colors, especially as display technology advances.

The display 110 may be a stripe panel where each color of subpixel is aligned with the next row. For example, each row may start with a red "R" subpixel, followed by a green "G" subpixel, followed by a blue "B" subpixel. Then, the next pixel starts again in the same sequence of "R, G, B" such that the row repeats "R, G, B, R, G, B, R, G, B." The next row below the first row has the same ordered sequence of subpixels such that the entire display 110 appears to have a column of red "R" subpixels, followed by a column of green "G" subpixels, followed by a column of blue "B" subpixels.

The display 110 may be an alternated stripe panel. For example, the arrangement of the subpixels may be varied, compared to the stripe panel discussed above, which may allow a higher resolution for the display 110. In an example, a first row of the display may repeat as "R, B, G, R, B, G, R, B, G" and a second row may repeat as "G, B, R, G, B, R, G, B, R" and so on, which results in columns that repeat as "R, G, R, G, R, G, R, G" followed by "B, B, B, B, B, B, B, B", and followed by "G, R, G, R, G, R, G, R,". Specifically, in this example, the order of the red "R" subpixels and the green "G" subpixels are interchanged every row to create a red "R" and green "G" subpixel checkerboard pattern with blue "B" subpixel stripes.

The display 110 may also be a non-striped variant. For example, the blue "B" subpixels may be rendered as a diamond in the center of a pixel square, and the rest of the pixel surface is split in four parts as a checker board of red "R" subpixels and green "G" subpixels with smaller sizes. Rendering images with this variant may use the same techniques as above, however, this configuration advantageously has a near-isotropic geometry that has the same geometric properties in both the horizontal and vertical directions, making the layout ideal for displaying the same image details even when the display 110 (e.g., LCD display) is rotated.

Figure 2:
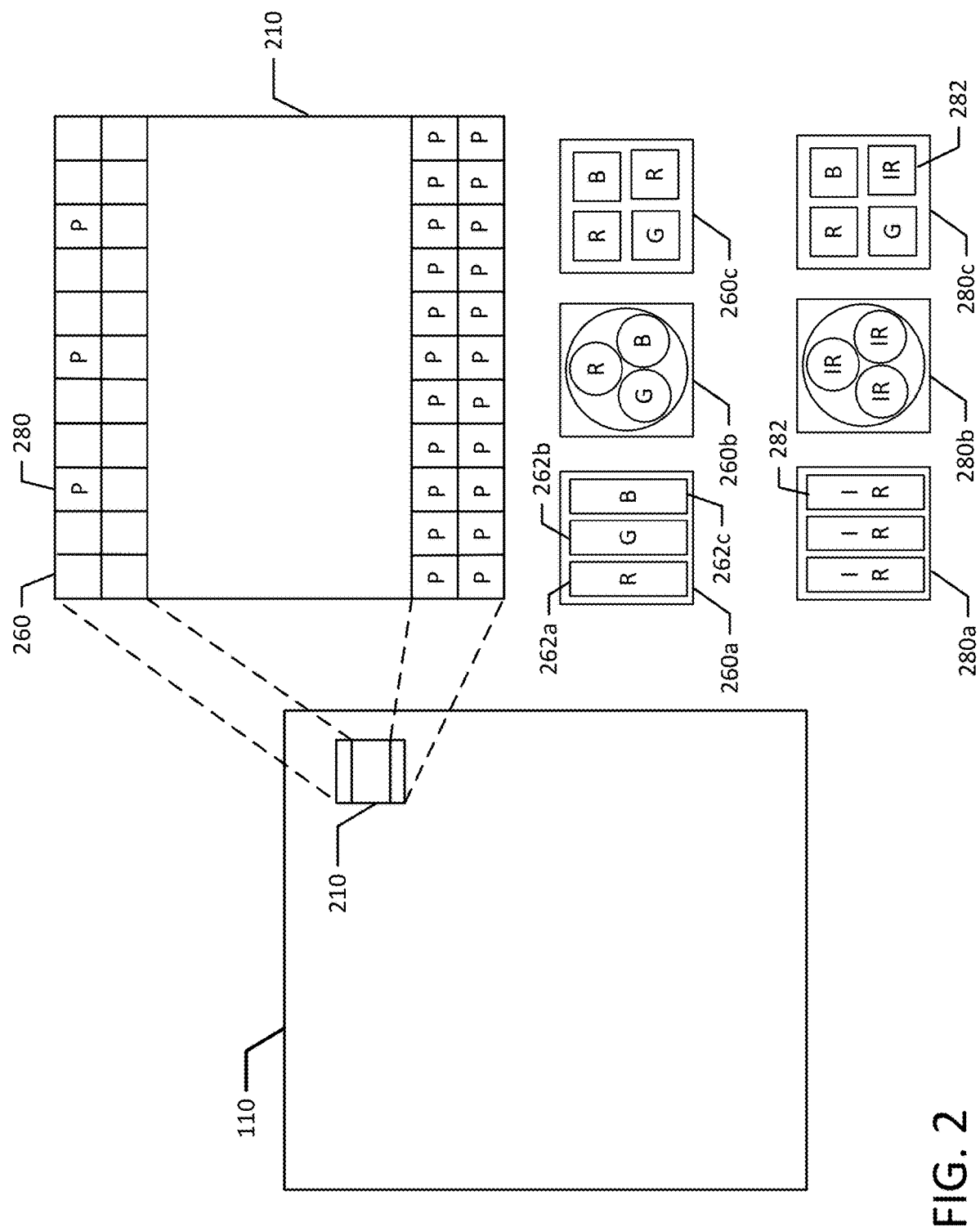
FIG. 2 illustrates a block diagram of an example un-photographable display and several example pixel configurations of the display, according to example embodiments of the present disclosure.

FIG. 2 illustrates various example pixels and subpixels of a display 110. A portion 210 of display 110 is illustrated in FIG. 2 which shows rows of pixels 260. As illustrated in FIG. 2, a protection pixel 280 is denoted by a 'P' in the pixel. The protection pixels 280 may be dispersed throughout the display. In one example, the protection pixels 280 may be repeated as every third pixel 260 in a row of pixels 260. Depending on the capabilities of the display 110, each pixel 260 may be protection enabled and therefore may be configured to serve as a protection pixel 280.

Each pixel may include one or more subpixels 262. Pixel 260a includes three rectangular subpixels 262a, 262b and 262c. In pixel 260a, subpixel 262a may be a red "R" rectangular subpixel, subpixel 262b may be a green "G" rectangular subpixel, and subpixel 262c may be a blue "B" rectangular subpixel. Pixel 260b includes three circular subpixels and pixel 260c includes four square subpixels. As illustrated in pixel 260c, some of the subpixels 262 may be the same color. For example, pixel 260c has two red "R" subpixels 262. Similarly, each protection pixel 280 may include one or more subpixels 262. In an example, a protection pixel 280 may have at least one protection subpixel 282. For example, protection pixels 280a and 280b are configured such that each subpixel 262 is a protection subpixel 282. Alternatively, and as illustrated by protection pixel 280c, a protection pixel 280 may have a single protection subpixel 282 while the remaining subpixels 262 are the same or similar to the subpixels 262 in the regular pixels 260 of the display 110.

A protection pixel 280 is configured to emit light at a protection wavelength and optionally at a protection brightness. For example, one or more of the protection subpixels 282 may be an infrared ("IR") subpixel that is configured to emit light outside of the visible spectrum and in the IR spectrum. The protection wavelength and/or the protection brightness may be selected such that the protection pixel 280 or more specifically a protection subpixel is configured to obscure a portion of the content displayed on display 110. For example, the protection pixel 280 or more specifically a protection subpixel 282 may be configured to obscure an image of the display 110 captured by a camera. The protection pixel(s) 280 or the protection subpixel(s) 282 may be configured to obscure an image taken of the display 110 by overpowering the light emitted from nearby pixels 260.

The protection pixel(s) 280 are configured to emit light that is bright enough to over-power the light emitted from neighboring pixels 260. For example, the light emitted from a protection pixel 280 may be adapted such that the light bleeds over to neighboring pixels 260 thereby masking the content displayed by those pixels when viewed by a camera. The protection pixel(s) 280 may emit a light that will overwhelm a camera sensor without being noticeable or visible to a human user. Additionally, the protection pixel(s) 280 may emit infrared light, which may interfere with and confuse an autofocus of a digital camera (e.g., cell-phone camera) or may soften the image because infrared light is focused differently from visible light. Visible light and infrared are both forms of electromagnetic ("EM") radiation, but with different wavelengths. Visible light has a wavelength of between 400 nm and 700 nm. The naked eye or a human user can only "see" the EM radiation in this range. At 700 nm and longer, the light or EM radiation enters the realm of infrared radiation. Most cameras are designed to capture an image of what a human user can or the "naked eye" can see. Typically, a camera detects EM radiation in the visible light spectrum (between 400 nm and 700 nm). However, charged couple devices used within cameras are typically manufactured to pick up EM radiation between 300 nm and 1100 nm, which means the cameras are capable of detecting infrared light too (between 700 nm and 1100 nm is infrared).

The charge capacity of an image sensor may be limited by either the individual photodiode characteristics (pixels) or a charged-coupled device ("CCD") itself. The charge capacity may be defined by a maximum amount of charge that the image sensor can collect and transfer while still maintaining all of the image sensor's design performance specifications. The charge capacity limit may be referred to as a saturation charge level. Once the saturation charge level is reached, the pixel or CCD is considered to be saturated. Exceeding the saturation level may result in bleeding or blooming (e.g., the generation of blooming artifacts) in captured images. The bleeding or blooming refers to the overflow of excess confined photo-generated charge from a photodiode well into adjacent structures when the maximum well charge capacity is exceeded. For example, the blooming or bleeding may result when the charge developed on a pixel leaks into adjacent pixels and corrupts the adjacent pixels. The blooming or bleeding may typically occur when there is a very bright spot detected by the image sensor, this bright spot diminishes the accuracy of the pixel data of surrounding pixels as the information from the bright spot (e.g., protection pixel 280) is then present in adjacent pixels. The extent of degradation of adjacent image areas as a result of the bleeding or blooming may depend on the CCD fabrication details and the degree of charge overflow. The blooming or bleeding is especially present when the image sensor attempts to capture long wavelength light (e.g., greater than 700 nm) because the long wavelength light reduces the effectiveness of light shields associated with the image sensor.

In some instances, to improve image quality, camera manufacturers may add films and filters to block out infrared light and ensure only visible light reaches the CCD. However, mobile phone cameras tend to be produced with lower quality and less expensive camera components. Many mobile phone cameras have a much thinner film/filter to block out infrared light. The lack of infrared filter allows the camera to capture or record IR radiation. This IR radiation may be used as one example of light or radiation emitted from the protection pixels 280. When the infrared radiation is recorded by the camera and appears in a photo or video, the photo or video may be blurred or distorted such that the photo is not an accurate representation of what is displayed in the screen.

Given a high display density, the protection pixels (e.g., human-invisible pixels) may be interspersed without significantly affecting the human-visible image. In an example, the density of the protection pixels 280 may be inversely proportional to the protection pixel's brightness and viewing angle. The display 110 may include tunable LEDs and each protection pixel 280 may be its own tunable LED. Using LEDs may be advantageous as the LEDs generally have a wide angle that allows the light to spill out and cover more area. As discussed in more detail below with respect to FIGS. 3A, 3B and 3C, a wider angle of an LED may allow a protection pixel 280 to protect a larger area or region of the display 110.

Figure 3A:
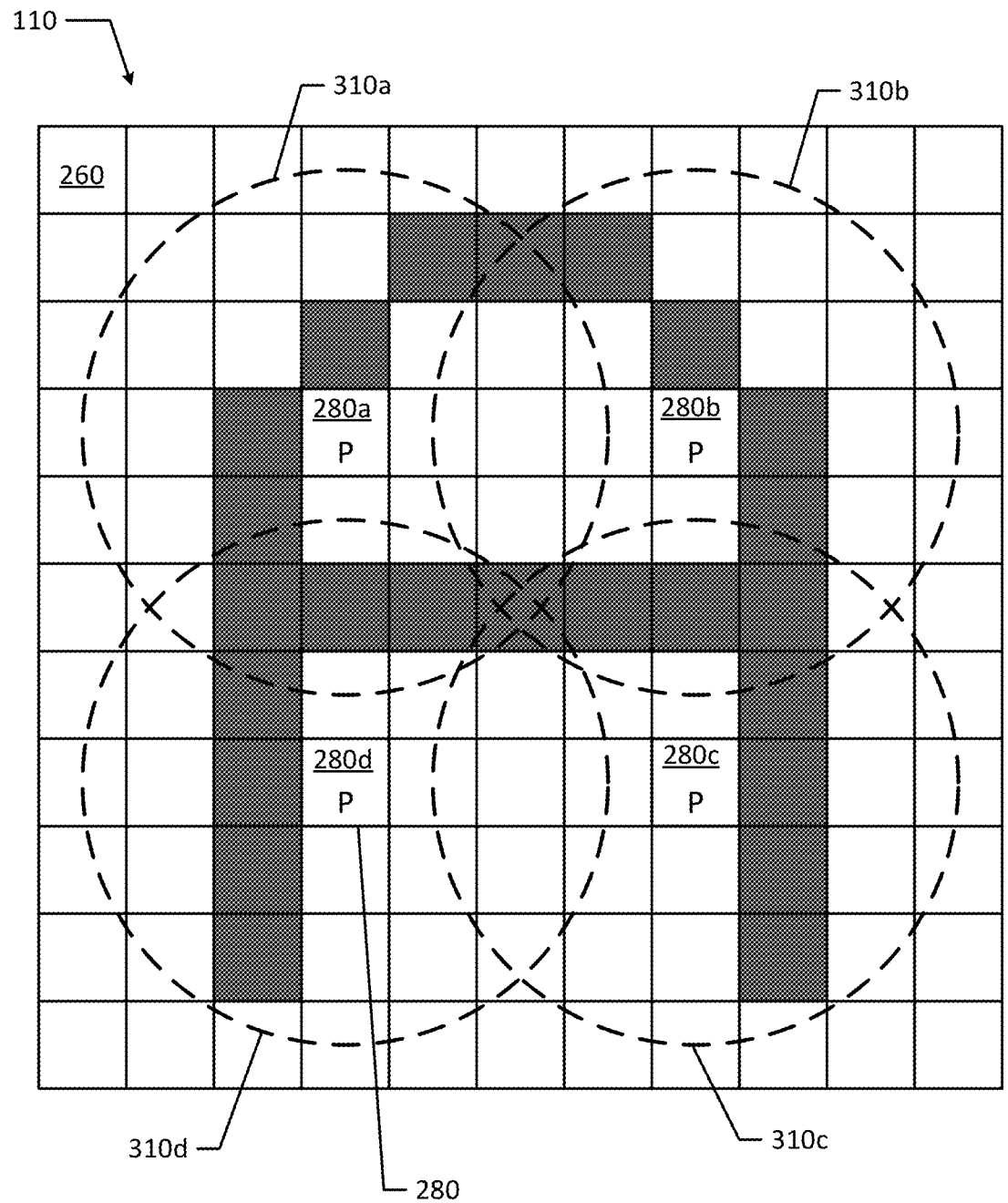
FIGS. 3A, 3B and 3C illustrate block diagrams of an example portion of an un-photographable display with different protection pixels activated, according to example embodiments of the present disclosure.
Figure 3C:
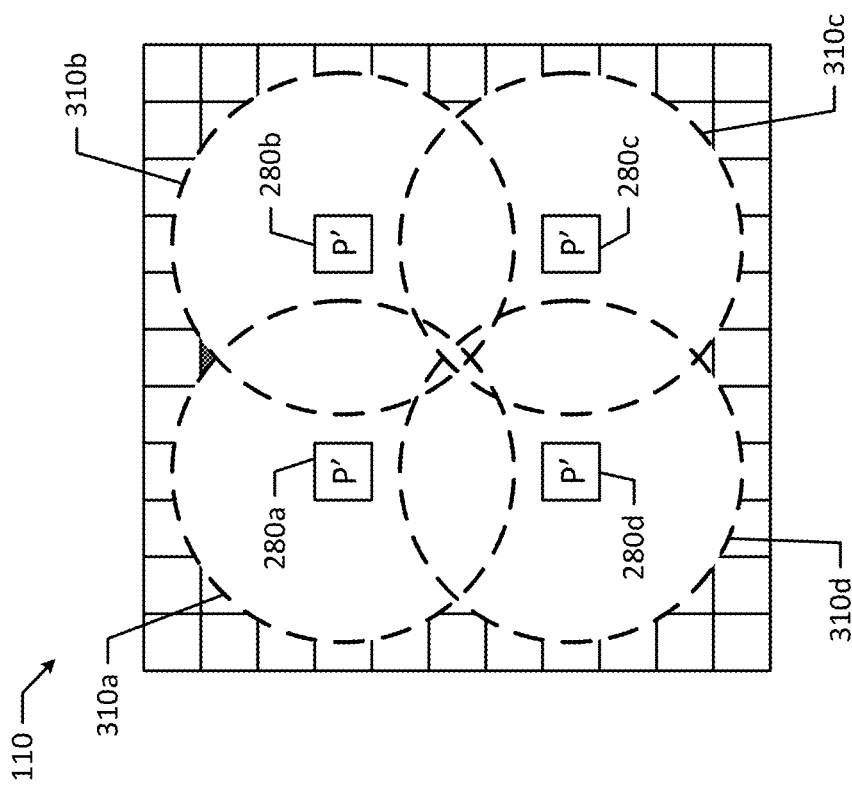
Figure 3B:
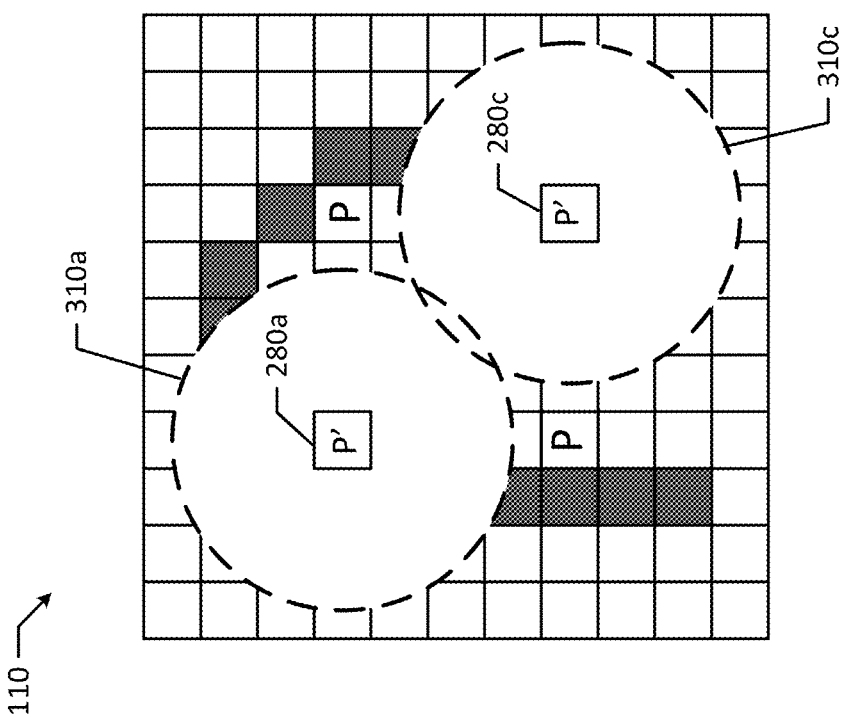

FIGS. 3A, 3B and 3C illustrate a simplified example of protecting content on a display with the protection pixels 280. For example, a text character "A" is represented in a simplified manner with a single pixel width for each portion of the letter "A." It should be appreciated that with modern displays, multiple pixels 280 would be used to render the letter "A" in a smoother fashion, however FIGS. 3A to 3C are used to illustrate an example protection range or protection boundary of a single protection pixel 280.

FIG. 3A illustrates a portion of the display 110 with the letter "A" rendered on the display. The letter "A" may be rendered in human-visible dark/black pixels with human-visible white pixels used as the background. There are four protection pixels 280 in the region of display 110 illustrated in FIG. 3A. The four protection pixels 280*a-d*, which may be referred to generally as protection pixels 280, may be configured to emit light in a camera visible, but human-invisible spectrum. For example, the protection pixels 280 may be configured to emit light in the IR spectrum. The location of the protection pixels 280 may be predetermined and static. For example, the display 110 may be manufactured with protection pixels 280 in designated positions on the display 110, for example, every fourth pixel in a row may be a protection pixel. In other examples, each pixel may have protection capabilities such that the location of activated protection pixels is dynamically chosen. The dashed-lines in FIG. 3A illustrates an example of protection zones 310*a-d*, hereinafter referred to generally as protection zone 310, that each protection pixel 280 may provide. For example, the protection zone 310 may be a circular zone with a diameter of approximately six pixels 260.

FIG. 3B illustrates the portion of the display 110 with two of the four protection pixels activated. As illustrated in FIG. 3B, an activated protection pixel (e.g., protection pixel 280*a* and 280*c*) is denoted by "P'." By activating the upper left most protection pixel 280*a* and the lower right most protection pixel 280*c*, most of the letter "A" rendered by the display is obscured from being captured in an image taken by a camera. For example, the activated protection pixels 280 may emit light in a camera visible, but human-invisible spectrum (e.g., in the IR spectrum), which may be bright enough to spread to and obscure neighboring pixels. The light emitted from the protection pixels P' may spread or bleed to other pixels in the protection zone 310, which in the illustrated example, is a circular zone with a diameter of approximately six pixels 260.

FIG. 3C illustrates the portion of the display 110 with all of the protection pixels P' (e.g., protection pixels 280*a-d*) activated. As illustrated in FIG. 3C, close to all of the letter "A" rendered by the display is obscured. It should be appreciated that other sizes and shapes of protection zones 310 may be achieved with different protection pixel configurations. For example, the protection zone 310 may be larger if brighter or higher intensity light is emitted from the protection pixels 280. Also, the protection zone 310 may be larger if a protection pixel 280 is entirely dedicated to emitting protection light instead of a single subpixel being dedicated to emitting protection light. As discussed above, the placement or density of the protection pixels 280 may be inversely proportional to the protection pixel's brightness and viewing angle. For example, a brighter protection pixel 280 may provide a larger protection zone 310 and therefore the display 110 may require a lower density of protection pixels 280. As noted above, tunable LEDs, such as those used for the protection pixels 280, may provide larger protection zones 310 than other pixel configurations. The LEDs may be color tunable, radiation tunable, brightness tunable, etc. Specifically, several different optical properties of the LED or pixel may be tuned. For example, by varying which of the sub-pixels in a pixel are activated or by varying the voltage (e.g., bias voltage) applied to the LED or pixel, the optical output may be tuned.

There are many different display technologies that may be used to protect sensitive data. For example, an OLED display may use individually lit LEDs, rather than a backlight. The display 110 may be configured such that some LEDs are targeted at the user while other LEDs (e.g., protection pixels 280) are targeted at the camera to distort and protect sensitive data on the display 110. In another example, backlit displays may be used where the display 110 includes different backlights. For example, the backlit display may include two backlights, one main backlight that produces human-visible light for regular content and one backlight (or multiple backlights) that produces human-invisible light that is configured to over-power the camera.

The protection portions of the display 110 may be designated by a filter applied to the display 110. For example, the display may include an optical filter, such as a liquid crystal filter (e.g. LCD filters). The liquid crystal filter, such as a liquid crystal tunable filter ("LCTF"), may use electronically controlled liquid crystal elements to transmit a selectable wavelength of light and exclude others. The power source 160 of the display 110 may apply a voltage across liquid crystal filters to adjust what light is passed through the filters. For example, the LCTF may control some elements (e.g., pixels) to transmit IR light in the protection portions of the display while other elements are controlled to transmit human-visible light. Depending on the voltage applied, different optical properties of the light (e.g., wavelength, brightness, polarizations, etc.) may be emitted by the pixels of the display.

In another example, each portion of the display 110 may be capable of emitting both white light (e.g., human-visible light) as well as IR light or another type of radiation or light with protection properties. A filter (e.g., an IR-filter) may be applied to portions of the display 110, such that those portions of the display 110 only emit light in the visible spectrum. In another example, the filter may filter out human-visible light so portions of the display 110 are only capable of emitting IR light.

The filters may be applied in front of a backlight on the display 110. For example, the backlight may have the ability to produce both human-visible light as well as light with protection properties (e.g., IR light). In another example, the backlight may be interrupted every few columns of pixels with a specific protection light (e.g., an IR light) that is designated for specific columns of protection pixels 280.

To increase security, multiple security pixels 280 may be capable of protecting the same display regions and different security pixels 280 may be activated at different times to protect the same display region. For example, for quicker determinations on which protection pixels are activated, a subset of the entire pool of protection pixels may be used to provide security to the display. The subset or group of protection pixels that can be activated at a given time may periodically change, which reduces the ability to maliciously decrypt the displayed content using filters or other decryption techniques.

As noted above, multiple security pixels 280 may be capable of protecting the same display regions. The optical filters described above may be activated (e.g., turned-on) or deactivated (e.g., turned-off) to prevent a single pixel 260, such as a protection pixel 280, from being powered on for too long. For example, the optical filters may be activated and deactivated to apply voltage to a specific protection pixel 280 for a period of time and then deactivate that protection pixel, while simultaneously applying voltage to another protection pixel associated with the same display region. By doing so, the display region is protected while advantageously extending the working life of each protection pixel 280. In an example with four protection pixels 280 designated to protect the same display region, the protection pixels 280 may be cycled on and off such that each pixel is activated for approximately 25 percent of the time sensitive data is presented in the display region.

As discussed above, the display 110 may have a predetermined set of pixels that are used as protection pixels 280. A protection pixel (e.g., protection pixel 280) may be configured to emit noise or an un-photographable combination of optical properties. The protection pixels 280 may be numbered, positioned, and arranged in such a way that even if each protection pixel emits light with the same spectral or optical properties, the protection achieved by activating those pixels appears to be random and dynamic to an image sensor (e.g., a camera). Depending on the type of sensitive content to be displayed by the display 110, an administrator may set a security setting based on a high, a medium, or a low amount of protection, by increasing or decreasing output of protection characteristics (e.g., intensity, brightness, wavelength, frequency, optical properties, spectral properties, etc.) from a set of protection pixels 280, or changing a quantity of protection pixels 280 that are activated. Alternatively, different sets of pixels 260 or varying amounts of protection pixels 280 may be used during a viewing session. In an example, protection pixels 280 may comprise between 50 and 90 percent of the display 110. In an example, up to 75 percent of the pixels 260 of display 110 may be used as protection pixels 280. In some instances 100 percent of the display 110 may have protection capabilities. However, in other instances, the protection pixels 280 may typically occupy less than 10 percent of the display. The portion of the display 110 dedicated to protection pixels 280 in the range of about 1 percent to about 25 percent, about 1 percent to about 20 percent, about 1 percent to about 15 percent, about 1 percent to about 10 percent, about 1 percent to about 5 percent, about 5 percent to about 25 percent, about 5 percent to about 20 percent, about 5 percent to about 15 percent, or about 5 percent to about 10 percent. In another example, the protection pixels 280 may occupy less than 1 percent of the display 110. While additional protection pixels 280 may reduce the overall resolution of the content on display 110, the added protection pixels also advantageously improve security. For example, if an unauthorized viewer were attempting to photograph the display 110 to copy the content on the display, the additional protection pixels 280 would further distort the content or image captured by the camera.

Figure 4:
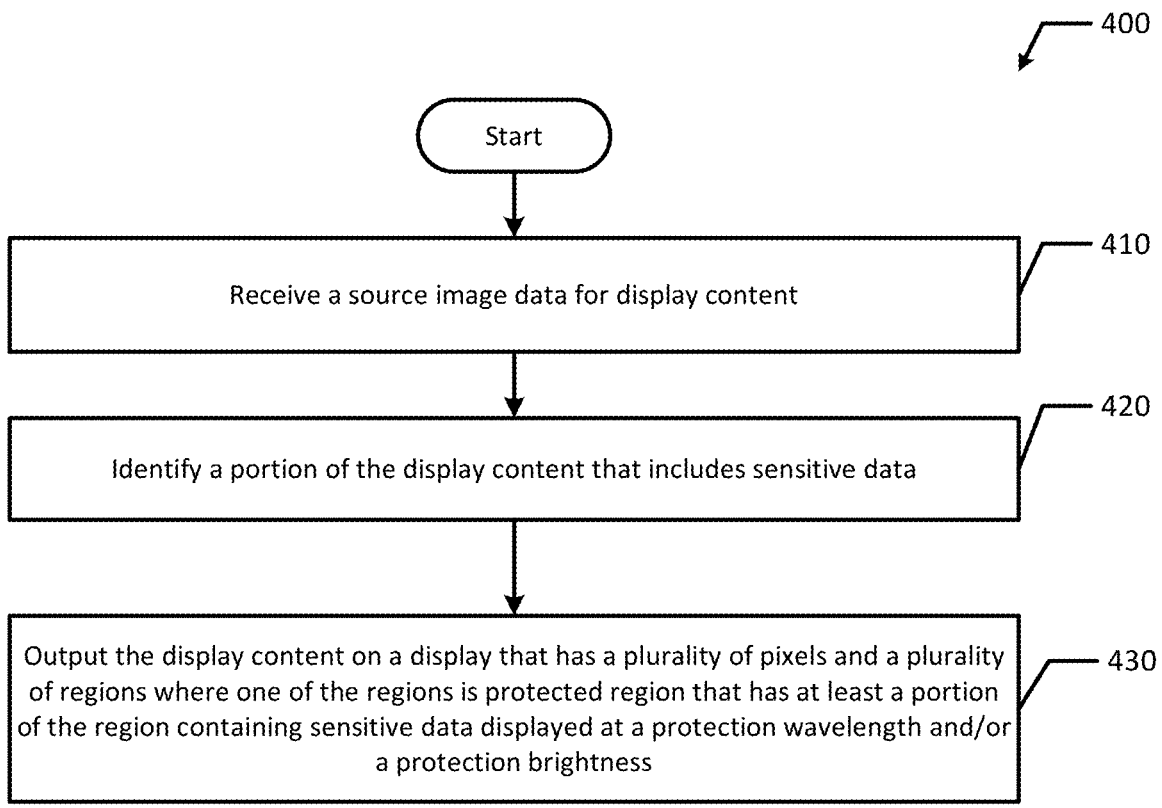
FIG. 4 illustrates a flowchart of an example process for protecting sensitive data on a display, according to an example embodiment of the present disclosure.

FIG. 4 illustrates a flowchart of an example method 400 for protecting sensitive data on a display, according to an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, blocks may be iterated or repeated, and some of the blocks described are optional. The method 400 may be performed by processing logic that may comprise hardware (circuitry, dedicated logic, etc.), software, or a combination of both.

The example method 400 includes receiving a source image data for display content (block 410). For example, a display 110 may receive source image data for display content. In an example, a receiver 140 for receiving an input of an image or video source may receive source image data. The receiver 140 may pass the source image data to an image generator 130 associated with the display 110. Then, a portion of the display content that includes sensitive data is identified (block 420). For example, the display 110 or a component of the display 110 may identify a portion of the display content that includes sensitive data. In an example, the source image data may include flags or other identifiers in a data packet header to indicate if the content is sensitive. Sensitive data may include a bank account number, a social security number, etc.

Method 400 also includes outputting the display content on a display that has a plurality of pixels and a plurality of regions where one of the regions is a protected region that has at least a portion of the region containing sensitive data displayed at a protection wavelength and/or a protection brightness (block 430). For example, the display 110 may output content on the display 110. In an example, the image generator 130 may output instructions regarding the content or may pass the content to be displayed to the display 110. The display 110 includes a plurality of pixels 260 and a plurality of regions 112a-c, hereinafter referred to generally as regions 112. Some regions 112 may be protected regions 114a-b, hereinafter referred to generally as protected region 114. For example, one of the regions 112 may be a protected region 114 that includes a protection pixel 280. In an example, the output display content is displayed such that at least a portion of the protected region 114, which contains the sensitive data, is displayed at either a protection wavelength or a protection brightness, or both the protection wavelength and the protection brightness. Additionally, the other regions 112 of the display may be displayed in a visible wavelength.

The protection wavelength and the protection brightness may be emitted from a predetermined set of protection pixels on display 110. In an example, the protection pixels may be capable of emitting light at a set number of different wavelengths and/or brightness. Protection pixels may also be dynamically activated and deactivated based on their position on the display 110 and the area of the display that is showing sensitive data. In another example, each pixel may be protection enabled and the location of the activated protection pixels may dynamically change during a viewing session.

As previously discussed, a filter may be used to create protected regions and unprotected regions on the display. For example, each pixel may have a subpixel that is capable of emitting light at the protection wavelength and the protection brightness, but the filter otherwise filters out the content from the protection subpixel, leaving only a set of unfiltered pixels to serve as protection pixels. The filter may be a band-pass filter, a liquid crystal filter, or other suitable filter configured to pass light that has specific optical properties or spectral characteristics. By passing light from some protection pixels while blocking other protection pixels, protected regions and unprotected regions can be established on the display 110.

In some examples, which are discussed above, an optical filter, such as an LCTF, may use electronically controlled liquid crystal elements to transmit a selectable wavelength of light and exclude others. For example, the LCTF may control some elements (e.g., pixels) to transmit IR light in the protection portions of the display while other elements are controlled to transmit human-visible light. In other examples, physical filters (e.g., band-pass filter, high-pass filter or low-pass filter) may be positioned in front of a back light to limit the type of light passed through that portion of the display 110. For example, the entire display may be protection enabled, and a physical filter may permanently filter IR light in those specified regions. The filters may have a banded (e.g., striped) or a mesh/grid (e.g., checkered) pattern such that the display 110 is broken up into several protection regions and several other display regions for displaying human-visible content. Also, as discussed above, instead of using filters, the display 110 may include different backlights in the same type of banded or grid patterns. For example, the display 110 may include a first backlight that produces white "W" light or red "R", green "G", and blue "B" light as well as one or more second backlights that produces IR light (or another type of light with protection properties). The second backlight(s) may produce a column of IR light for every few columns of pixels 260. Each column of pixels may include an "R" sub-pixel, a "G" sub-pixel and a "B" sub-pixel. In either configuration, the display 110 is advantageously adapted to emit light in a protection spectrum (e.g., human-invisible light that distorts images captured by a camera) as well as in a human-visible spectrum.

Figure 5A:
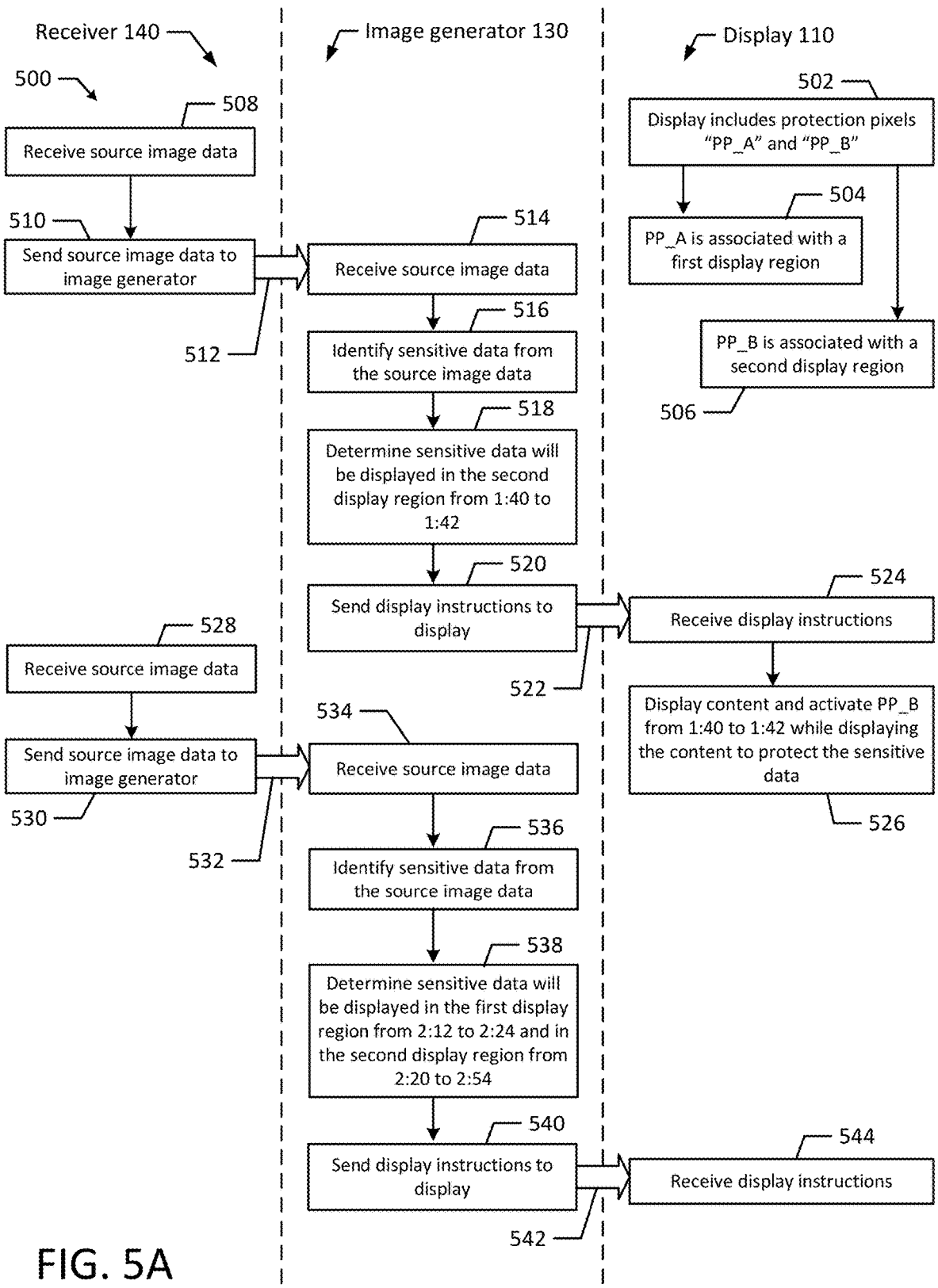
FIGS. 5A and 5B illustrate a flow diagram of an example process for protecting sensitive data on a display, according to an example embodiment of the present disclosure.
Figure 5B:
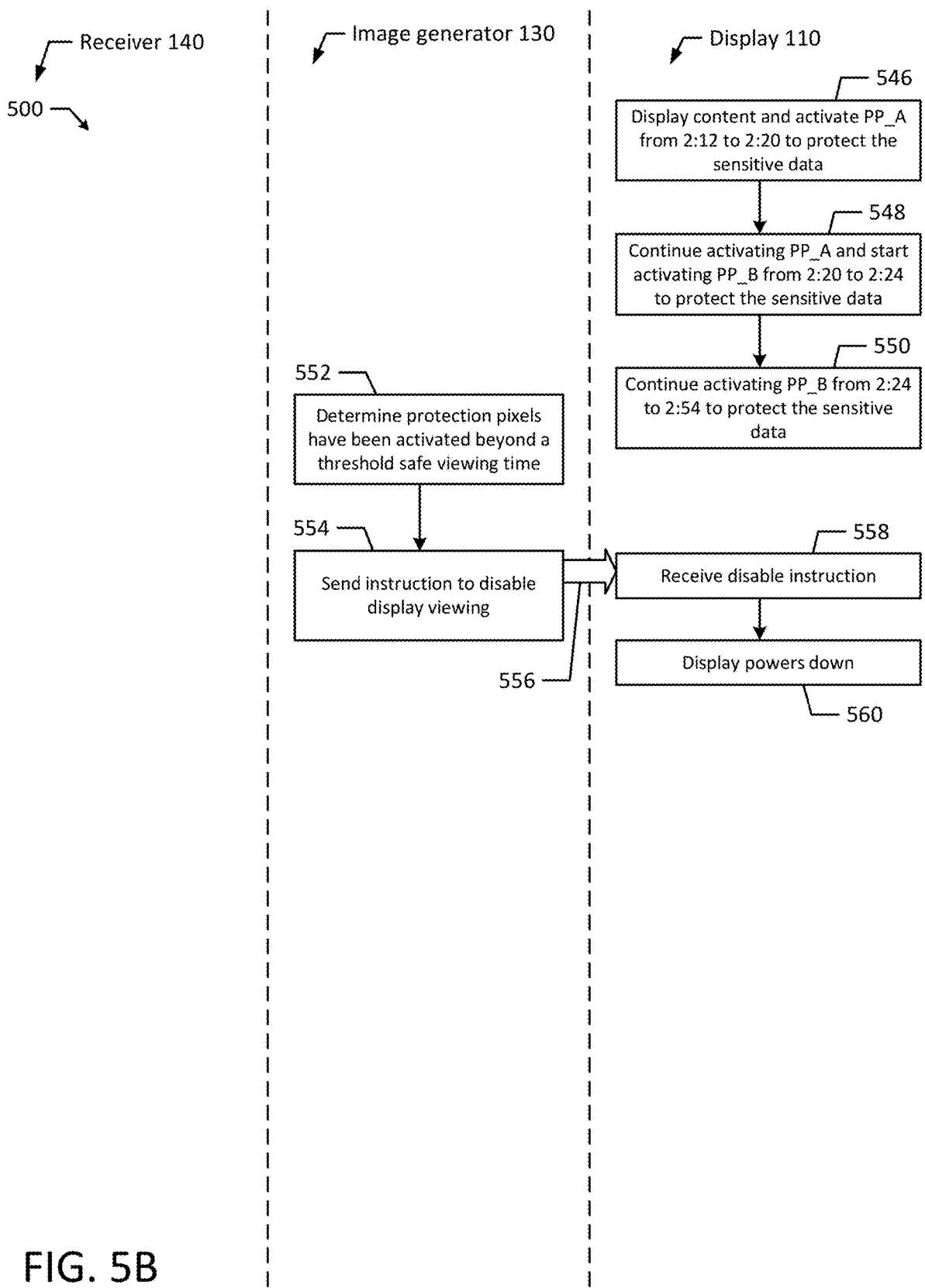

FIGS. 5A and 5B illustrate a flowchart of an example method 500 for protecting sensitive data on a display in accordance with an example of the present disclosure. Although the example method 500 is described with reference to the flowchart illustrated in FIGS. 5A and 5B, it will be appreciated that many other methods of performing the acts associated with the method 500 may be used. For example, the order of some of the blocks may be changed, certain blocks may be combined with other blocks, and some of the blocks described are optional. For example, a receiver 140 and an image generator 130 may communicate with a display 110 to perform example method 500.

In the illustrated example, a display 110 includes a first protection pixel 280, hereinafter referred to as "protection pixel_A" or "PP_A" and a second protection pixel 280, hereinafter referred to as "protection pixel_B" or "PP_B" (block 502). The display may include a plurality of protection pixels 280 and regular pixels 260. Each pixel 260 and protection pixel 280 may be made up of several different subpixels 262. In an example, the protection pixels 280 (e.g., "PP_A" and "PP_B") may include one or more protection subpixels 282. In the illustrated example, "PP_A" is associated with a first display region (block 504). For example, "PP_A" may be associated with a circular region of the display with a radius of approximately six pixels. Similarly, "PP_B" is associated with a second display region (block 506). The second display region may be spaced apart from and different from the first display region. In reality, the display 110 may include tens, hundreds or thousands of display regions and associated protection pixels 280. Additionally, multiple protection pixels 280 may be assigned to a specific display region.

A receiver 140 may receive source image data (block 508). For example, the receiver 140 may receive source image data related to a client's financial information. When processing a loan application, the source image data may include form data that includes a client's SSN, income, bank account info, etc. The receiver 140 may send the source image data 512 to an image generator 130 (block 510). The source image data may be generated from a word processor, the Internet, email, videos, etc. The source image data may also be generated from other computer applications. Then, the image generator 130 receives the source image data 512 (block 514). The source image data may be provided as a data stream, a batch of packet data, or as an executable display file.

After receiving the source image data 512, the image generator 130 may identify sensitive data from the source image data 512 (block 516). For example, the source image data may be coded in such a way that sensitive data is flagged or otherwise marked as sensitive within the source image data 512 itself. In the case of the source image data 512 being pre-marked, the image generator 130 may identify the flags to identify the sensitive data. In another example, the image generator 130 may compare the source image data 512 to a database of sensitive data to identify portions of the data that are sensitive. In another example, the image generator may recognize certain text or strings in the source image data that typically involve sensitive material (e.g., a bank account number, an address, an SSN number, etc.), and may identify sensitive data based on the type of data or pattern of the data.

In the illustrated example, the image generator 130 determines that sensitive data will be displayed in the second display region from 1:40 to 1:42 (block 518). For example, for video data, the video may present sensitive data from timestamp 1:40 of the video to timestamp 1:42 of the video. Then, the image generator 130 sends the display instructions 522 to the display 110 (block 520). The display instructions may include instructions for how texts, graphics, and media are to be displayed by display 110.

The display 110 receives the display instructions 522 (block 524). Then, the display 110 displays content and activates "PP_B" from 1:40 to 1:42 while displaying the content to protect the sensitive data (block 526). As noted above, the content may be a video that includes sensitive data from timestamp 1:40 of the video to timestamp 1:42 of the video. By activating "PP_B" during that time, the sensitive data appearing in the second display region is protected from unauthorized copying (e.g., photo or video capture).

The receiver 140 may receive additional source image data (block 528). For example, the receiver 140 may receive source image data related to another client's financial information, which may include form data that includes a client's SSN, income, bank account info, etc. The receiver 140 may send the source image data 532 to an image generator 130 (block 530). The source image data may be generated from a word processor, the internet, email, videos, etc. The source image data may also be generated from other computer applications. Then, the image generator 130 receives the source image data 512 (block 534).

After receiving the source image data 532, the image generator 130 may identify sensitive data from the source image data 532 (block 536). For example, the source image data may be coded in such a way that sensitive data is flagged or otherwise marked as sensitive within the source image data 532 itself. In the case of the source image data 532 being pre-marked, the image generator 130 may identify the flags to identify the sensitive data. In another example, the image generator 130 may compare the source image data 532 to a database of sensitive data to identify portions of the data that are sensitive. In another example, the image generator may recognize certain text or strings in the source image data that typically involve sensitive material (e.g., a bank account number, an address, an SSN number, etc.), and may identify sensitive data based on the type of data or pattern of the data.

In the illustrated example, the image generator determines that sensitive data will be displayed in the first display region from 2:12 to 2:24 and then displayed in the second display region from 2:20 to 2:54 (block 538). For example, for video data, the video may present sensitive data from timestamp 2:12 to 2:24 of the video as well as from timestamp 2:20 of the video to 2:54 of the video. Then, the image generator 130 sends the display instructions 542 to the display 110 (block 540). The display instructions may be sent in near real-time and may include instructions for how texts, graphics, and media are to be displayed by display 110. The display 110 receives the display instructions 542 (block 544). The display instructions 542 may identify which pixels 260 to activate at which times as well as how and when to activate protection pixels 280.

Continuing on FIG. 5B, the display 110 displays content and activates "PP_A" from 2:12 to 2:20 to protect the sensitive data (block 546). As noted above, the content may be a video that includes sensitive data from timestamp 2:12 of the video to timestamp 2:20 of the video. By activating "PP_A" during that time, the sensitive data appearing in the first display region is protected from unauthorized copying (e.g., photo or video capture). The display 110 continues to activate "PP_A" and also activates "PP_B" from 2:20 to 2:24 to protect the sensitive data (block 548). Similarly, the display 110 continues to activate "PP_B" from 2:24 to 2"54 to protect the sensitive data (block 550). In the illustrated example, the protection pixels 280 (e.g., "PP_A" and "PP_B") are only activated when sensitive data is shown on the display 110 to protect the user from extended exposure to protection pixel emissions. Depending on the type of sensitive content to be displayed by the display 110, the protection may be set to a high, a medium, or a low level or amount of protection. A low level of protection may have protection pixels that have a low output of protection characteristics (e.g., intensity, brightness, wavelength, frequency, optical properties, spectral properties, etc.). For example, the low level of protection may be safe enough to leave on indefinitely while a user is viewing the display. As the level of protection increases to medium or high, the maximum amount of time a protection pixel is activated or similarly the maximum amount of time a user may be exposed to the emissions of the protection pixels 280 may be limited. For example, the maximum exposure time at the high protection level may be a shorter duration than the maximum exposure time at the medium protection level, which are both shorter in duration than the maximum exposure time at the low protection level.

While the display 110 is displaying content, the image generator 130 may determine that protection pixels have been activated beyond a threshold safe view time (block 552). For example, for every viewing hour, the user may be limited or allowed a total of a few minutes of exposure to high strength protection pixel emissions (e.g., a high protection level setting). The exposure limit may be based on the protection characteristics (e.g., intensity, brightness, wavelength, frequency, optical properties, spectral properties, etc.) of the protection pixels 280. Then, the image generator 130 sends an instruction 556 to disable viewing (block 554). In an example, the instruction 556 may be to disable the entire display 110. In another example, the instruction 556 may be to stop display sensitive data, and therefore stop activating any of the protection pixels 280. The display 110 receives the disable instruction 556 (block 558). After receiving the instruction 556, the display 110 powers down (block 560). Once the display powers down, the display may have a lock-out or time-out feature before the display 110 can once again start showing sensitive data and activating protection pixels.

Specifically, high levels of exposure to human-invisible frequencies from the electromagnetic spectrum may be harmful to users and therefore the display 110 may include safeguards to minimize or eliminate excess exposure. The risk associated with the activated protection pixels 280 may depend on the frequency, wavelength, intensity and/or brightness of the light emitted by the protection pixels 280. To minimize the risk, the display 110 may be configured to activate the protection pixels 280 only when sensitive data is presented on the display or screen. In another example, the image generator 130 or another component of the display 110 may generate a warning that is presented to the user informing the user that sensitive data is about to be presented. For added safety, the user may choose to wear safety glasses that filter some of the harmful properties of the protection pixels 280.

Alternatively, the display 110 may be configured such that the protection pixels 280 may be activated for up to a predetermined time threshold before the display is paused or shut down. In an example, the display 110 may automatically measure the exposure time of the user and may prohibit further exposure after a maximum safe period of time is reached.

Figure 6:
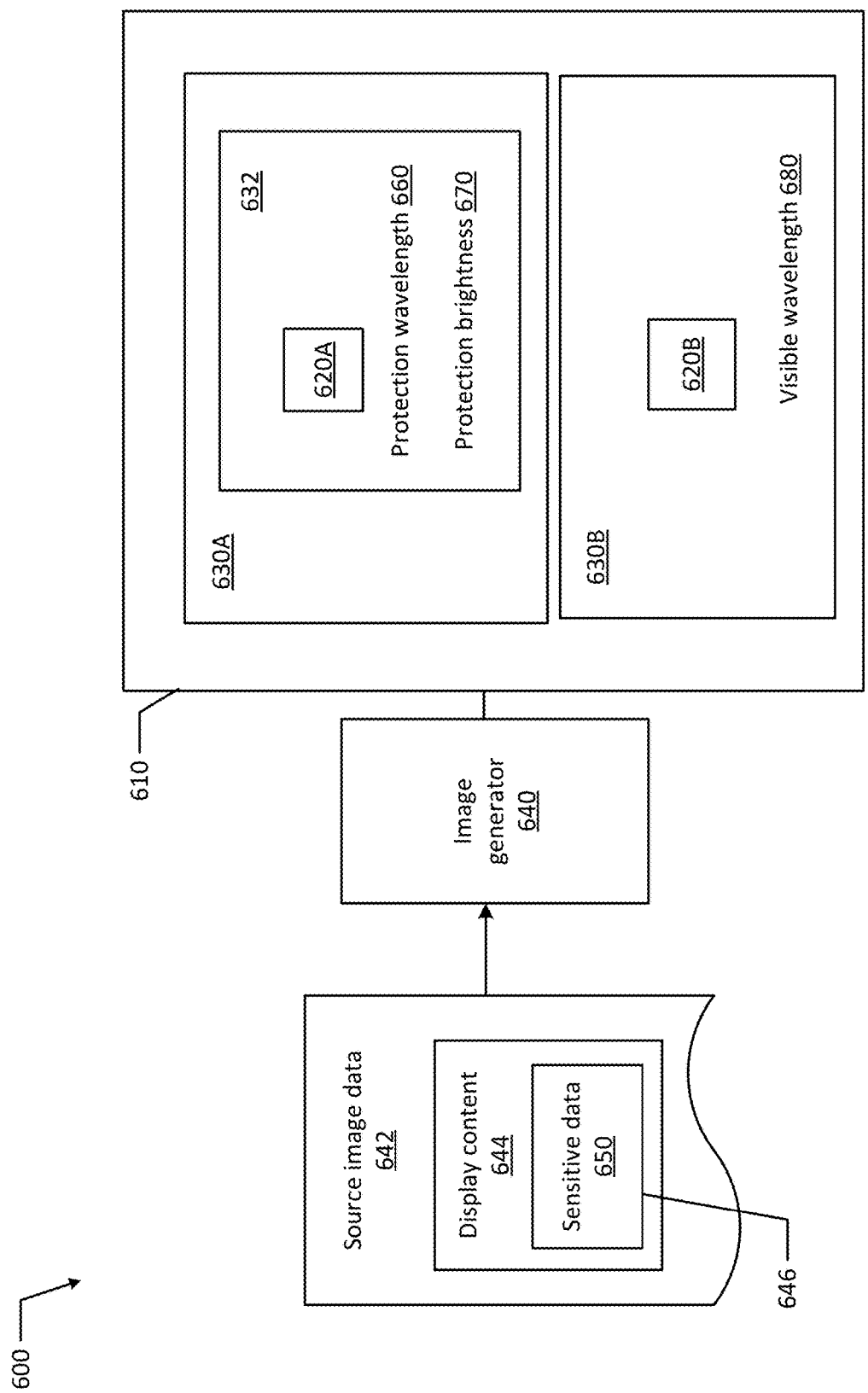
FIG. 6 illustrates a block diagram of an example display device, according to an example embodiment of the present disclosure.

FIG. 6 is a block diagram of an example display device 600. The display device 600 includes a display 610 comprising a plurality of pixels 620A-B. The display 610 also has a plurality of regions 630A-B. At least one of the plurality of regions (e.g., region 630A) is a protected region (e.g., region 630A) and the protected region (e.g., region 630A) includes at least one protection pixel (e.g., pixel 620A). The display device also includes an image generator 640, which may be configured to receive a source image data 642 for display content 644. The image generator 640 may also be configured to identify a portion 646 of the display content 644 that includes sensitive data 650. Additionally, the image generator 640 may be configured to output the display content 644 such that at least a portion 632 of the protected region (e.g., region 630A) containing the sensitive data 650 is displayed at either a protection wavelength 660, or a protection brightness 670, or both a protection wavelength 660 and a protection brightness 670. In an example, the other respective plurality of regions (e.g., region 630B) may be displayed in a visible wavelength 680. The light emitted from the protection pixel (e.g., pixel 620A) advantageously protects the sensitive data 650 and masks the sensitive display content 644 by preventing the protection pixel (e.g., pixel 620A) and associated display region (e.g., region 630A) from being captured by a camera.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
a display comprising a plurality of pixels and having a plurality of regions, wherein at least one of the plurality of regions is a protected region and the protected region includes a plurality of protection pixels, including a first subset of protection pixels and a different second subset of protection pixels configured to be activated at different times in the protected region;
an image generator configured to:
receive source image data for display content,
identify a portion of the display content that includes sensitive data, and
output the display content while periodically cycling between the first subset on and the second subset off, then the second subset on and the first subset off, such that at least a portion of the protected region containing the sensitive data is displayed as protection light for a measured period of time in a protection wavelength and a protection brightness that is brighter than a brightness of the sensitive data.

2. The display device of claim 1, wherein each pixel includes multiple subpixels, and wherein the multiple subpixels include at least an "R" subpixel, a "G" subpixel, and a "B" subpixel.

3. The display device of claim 2, wherein a subpixel of the multiple subpixels is a protection subpixel.

4. The display device of claim 1, wherein the protection wavelength is a wavelength outside of the visible spectrum.

5. The display device of claim 1, wherein at least one of the protection wavelength or the protection brightness is configured to at least one of obscure an image captured by a camera or over-power light emitted from nearby pixels.

6. The display device of claim 5, wherein a respective protection pixel, of the plurality of protection pixels, is at least one subpixel.

7. The display device of claim 1, wherein the portion of the protected region containing the sensitive data is displayed in at least one of a protection wavelength or a protection brightness while the other respective plurality of regions are displayed in a visible wavelength.

8. The display device of claim 1, wherein the protected region includes a plurality of sub-regions.

9. The display device of claim 1, wherein the image generator is further configured to determine a position of the protected region, and wherein the position of the protected region is based on at least one of an instruction, received by the image generator indicating the position, protection information included in the source image data, and or a set of rules applied to the source image data.

10. The display device of claim 1, wherein the image generator is further configured to determine a position of each of the plurality of protection pixels to activate, and wherein each of the plurality of protection pixels has a respective position on the display.

11. The display device of claim 10, wherein each respective position is a predetermined static position, and wherein the image generator is configured to activate a subset of the plurality of protection pixels based on the protection information.

12. The display device of claim 10, wherein each respective position is a dynamic position that is adjusted based on the protection information.

13. A method comprising:
receiving, by hardware, source image data for display content;
identifying, by the hardware, a portion of the display content that includes sensitive data; and
outputting the display content on a display, wherein
the display comprises a plurality of pixels and has a plurality of regions,
at least one of the plurality of regions is a protected region and the protected region includes a plurality of protection pixels, including a first subset of protection pixels and a different second subset of protection pixels configured to be activated at different times in the protected region, and
the output display content is displayed while periodically cycling between the first subset on and the second subset off, then the second subset on and the first subset off, such that at least a portion of the protected region containing the sensitive data is displayed as protection light for a measured period of time in a protection wavelength and a protection brightness that is brighter than a brightness of the sensitive data.

14. The method of claim 13, further comprising providing a warning to a user that the sensitive data is about to be presented.

15. The method of claim 13, further comprising:
enabling protection of the sensitive data for a period of time while the other respective plurality of regions are displayed in a visible wavelength; and
upon expiration of the period of time, disabling at least a portion of the display.

16. The method of claim 13, further comprising determining a position of the protected region, and wherein determining the position of the protected region is based on at least one of an an instruction that indicates the position, protection information included in the source image data, or a set of rules applied to the source image data.

17. The method of claim 13, further comprising determining a position of each of the plurality of protection pixels to activate, and wherein each of the plurality of protection pixels has a respective position on the display.

18. The method of claim 17, wherein each respective position is a predetermined static position, and wherein the image generator is configured to activate a subset of the plurality of protection pixels based on the protection information.

19. The method of claim 17, wherein each respective position is determined based on a threshold ratio of protection pixels to other pixels in a pixel area.

20. A non-transitory machine readable medium storing code, which when executed by at least one processor is configured to:

receive source image data for display content;

identify a portion of the display content that includes sensitive data; and output the display content on a display, wherein the display comprises a plurality of pixels and has a plurality of regions, at least one of the plurality of regions is a protected region and the protected region includes a plurality of protection pixels, including a first subset of protection pixels and a different second subset of protection pixels configured to be activated at different times in the protected region, and the output display content is displayed while periodically cycling between the first subset on and the second subset off, then the second subset on and the first subset off, such that at least a portion of the protected region containing the sensitive data is displayed as protection light for a measured period of time in a protection wavelength and a protection brightness that is brighter than a brightness of the sensitive data.

* * * * *

UNITED STATES PATENT AND TRADEMARK OFFICE
CERTIFICATE OF CORRECTION

| | | |
|---|---|---|
| PATENT NO. | : 11,409,917 B2 | Page 1 of 1 |
| APPLICATION NO. | : 17/003456 | |
| DATED | : August 9, 2022 | |
| INVENTOR(S) | : Robinson et al. | |

It is certified that error appears in the above-identified patent and that said Letters Patent is hereby corrected as shown below:

In the Claims

Column 16, Line 20 Claim 9, replace "data, and or a set" with -- data, or a set --.

Signed and Sealed this
Fifteenth Day of November, 2022

Katherine Kelly Vidal
*Director of the United States Patent and Trademark Office*